United States Patent [19]

McKenzie et al.

[11] Patent Number: 5,799,177

[45] Date of Patent: Aug. 25, 1998

[54] AUTOMATIC EXTERNAL CLOCK DETECT AND SOURCE SELECT CIRCUIT

[75] Inventors: Meredith McKenzie, Cupertino, Calif.; Jerry D. Carter, Mesa; Nicholas Ong, Tempe, both of Ariz.

[73] Assignee: Intel Corporation, Santa Clara, Calif.

[21] Appl. No.: 778,559

[22] Filed: Jan. 3, 1997

[51] Int. Cl.$^6$ ............................................. G06F 1/04
[52] U.S. Cl. ............................................. 395/556
[58] Field of Search ........................ 395/556, 560, 395/750.04, 750.05

[56] References Cited

U.S. PATENT DOCUMENTS 4,322,580  3/1982  Khan et al. ................. 395/556 X
5,479,648  12/1995  Barbera et al. ................ 395/730.04

*Primary Examiner*—Thomas M. Heckler
*Attorney, Agent, or Firm*—Blakely, Sokoloff, Taylor & Zafman

[57] ABSTRACT

An apparatus for selecting a clock source in a microprocessor. The apparatus receives a first clock and a second clock. The apparatus has a clock select unit capable of detecting the first clock and selecting between the first clock and the second clock without an external selection signal indicating which clock is to be selected. If the clock selection unit detects the first clock, then the first clock is selected. Otherwise, if the first clock is not detected, then the second clock is selected. The clock selection unit provides an output clock based on the selection.

10 Claims, 5 Drawing Sheets

5,799,177

AUTOMATIC EXTERNAL CLOCK DETECT AND SOURCE SELECT CIRCUIT

FIELD OF THE INVENTION

The present invention relates to computer system clocks and, more specifically, to internal and external clocks used in microprocessors. Even more particularly, the present invention relates to a method and apparatus in which to automatically detect an active clock signal and to automatically select as the internal clock source one of multiple clock sources.

BACKGROUND OF THE INVENTION

In a typical personal computer having a microprocessor, the computer system provides the microprocessor with the system clock or some other clock external to the microprocessor. The system clock (or external clock) is then typically used by the microprocessor as its fundamental internal clock to clock its internal components. The microprocessor may divide the external clock by a predetermined amount for different peripheral components within the microprocessor. Although the internal clocks differ in frequency, they are still based off of the external clock provided by the system.

Microprocessors, however, are now found in many devices other than personal computers, including many different mobile devices. An important issue in the design of mobile devices is power consumption because mobile devices are typically powered by batteries, which have a limited power supply. The greatest amount of power consumption in CMOS chips occurs on the leading and trailing edges of clock pulses (i.e., when a clock signal transitions from a low voltage state to a high voltage state, or vice versa). Therefore, when the operating speed of a CMOS chip is increased, the number of clock pulses in a particular time period also increases, thereby increasing the power consumption of the chip during this time period. Similarly, a decrease in the operating speed of the chip results in a decrease in the number of clock pulses in a particular time period, thereby decreasing the power consumption of the chip during this time period.

To reduce the power consumption of the system, many different techniques of controlling the clock are used. Typically, the clock continues to toggle during idle time, thereby needlessly consuming power. One method to reduce power by controlling the clock signal is through the use of a dynamic power management system that turns off clock signals to system components while they are idle. An alternative method, which can be used independently or in conjunction with the above method of enabling or disabling different system components, is to reduce the operating frequency of the clock signal. Thus, in the typical microprocessor, which bases its internal clocks off of the external clock provided by the system, a reduction in the external clock frequency provided results in a reduction in its internal clock frequency, thereby reducing the power consumed by the microprocessor.

SUMMARY OF THE INVENTION

One desire of the present invention is to reduce system power.

Another desire of the present invention is to automatically detect when an input clock is active and to automatically select a clock from among multiple input clocks.

Another desire of the present invention is to detect when one of the multiple input clocks is active and to automatically select that clock for use by the system when that clock is found to be active.

An apparatus for selecting a clock source in a microprocessor is described. The apparatus receives a first clock and a second clock. The apparatus has a clock select unit capable of detecting the first clock and selecting between the first clock and the second clock without an external source select signal indicating which clock is to be selected. If the clock selection unit detects the first clock, then the first clock is selected. Otherwise, if the first clock is not detected, then the second clock is selected. The clock selection unit provides an output clock based on the selection.

Other desires, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
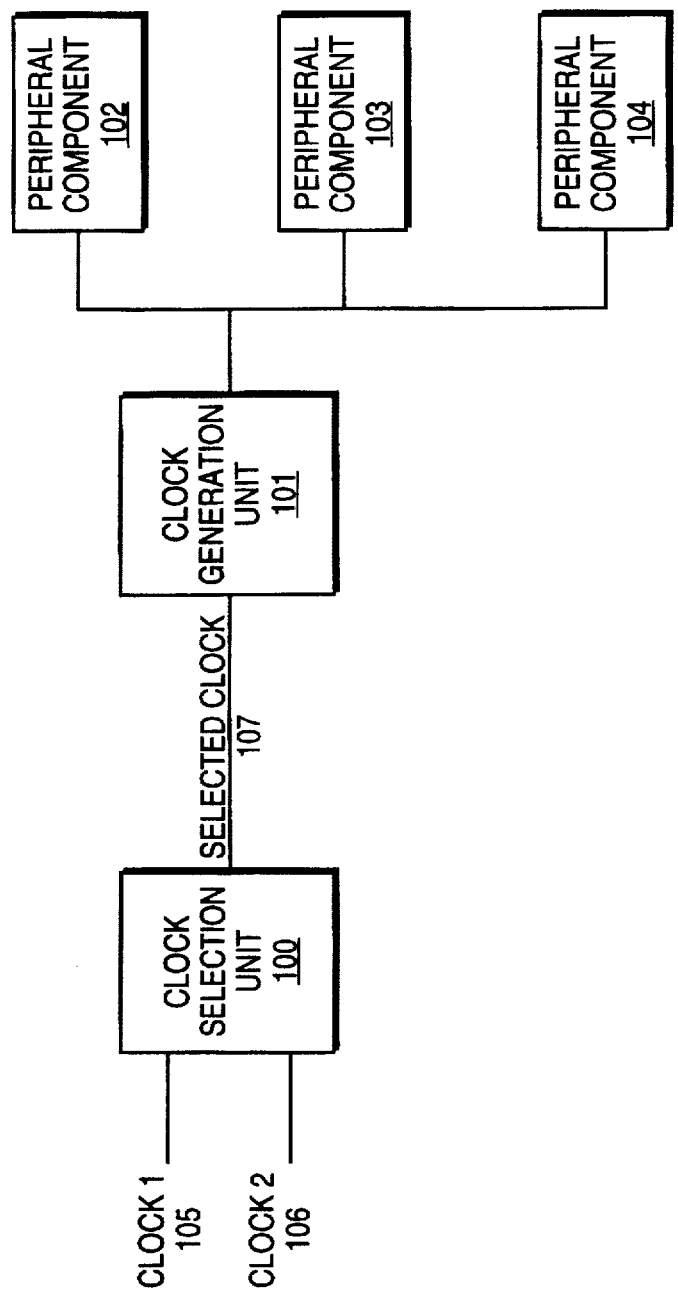
FIG. 1 is a block diagram of a microprocessor having multiple clock source inputs and shows the relationship between the multiple clock source inputs, the selected clock output from the clock selection unit, and the peripheral components.

FIG. 1 shows one embodiment of the present invention for automatically detecting a clock source and automatically selecting that clock source when detected. The system contains a clock selection unit 100, a clock generation unit 101 and peripheral components (102, 103, and 104). The clock selection unit 100 receives clock1 105 and clock2 106 as inputs and outputs selected clock 107. The output of the clock selection unit 100 is the selected clock 107, which is either clock1 105 or clock2 106, depending upon which clock is selected by the clock selection unit 100. The selected clock 107 is then sent to the clock generation unit 101 to be used as the fundamental clocking source for the peripheral components (102, 103, and 104).

Figure 2:
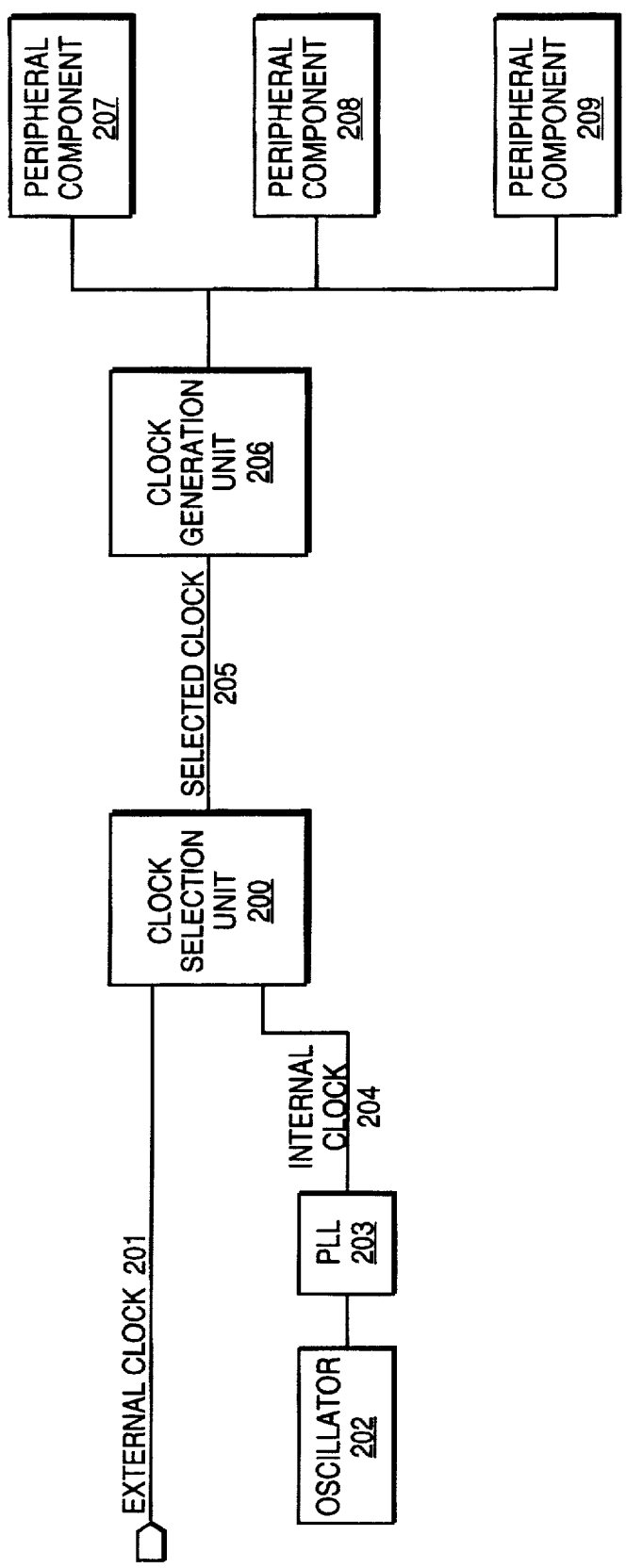
FIG. 2 is a block diagram of a microprocessor having an external input clock and an internally generated clock, and shows the relationship between the external and internal clocks, the selected clock output from the clock selection unit, and the peripheral components.

FIG. 2 shows another embodiment of the present invention for automatically detecting a clock source and automatically selecting that source when detected. The system contains the clock selection unit 200, a clock generation unit 206 and peripheral components (207, 208 and 209). The clock selection unit 200 receives external clock 201 and internal clock 204 as inputs and outputs selected clock 205. External clock 201 is a clock provided externally to the system. The internal clock 204 is provided internally by the system through the use of an oscillator 202 and a PLL 203.

The output of the clock selection unit 200 is the selected clock 205, which is either external clock 201 or internal clock 204, depending upon which clock is selected by the clock selection unit 200. If the clock selection unit detects an internal clock 204 then the internal clock is selected. Otherwise, if the internal clock 204 is not detected, then the external clock 201 is selected. The selected clock 107 is then sent to the clock generation unit 101 to be used as the fundamental clocking source for the peripheral components (102, 103, and 104).

Figure 3:
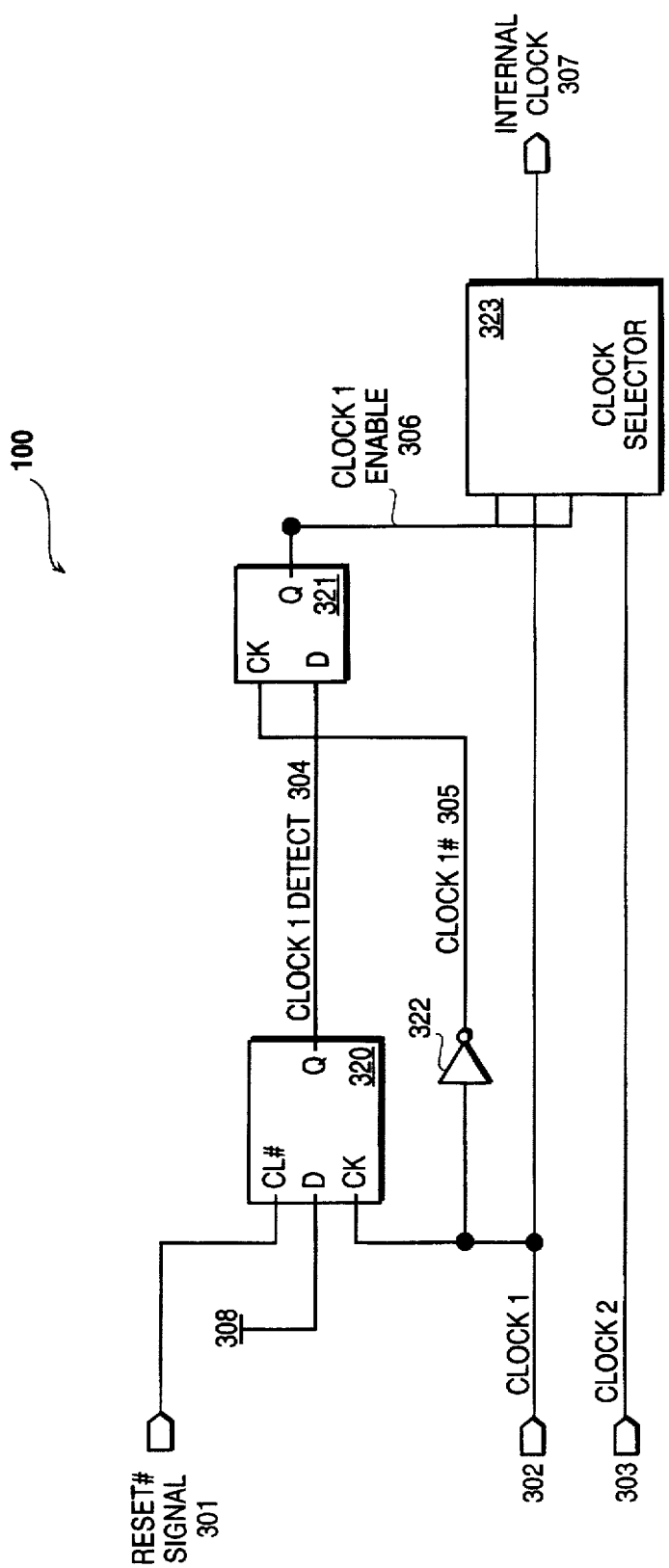
FIG. 3 is a block diagram of an apparatus to implement the automatic clock detect and source select of one embodiment of the present invention.

FIG. 3 shows a block diagram of one embodiment of the clock selection unit 100 of FIG. 1 and 2. The clock selection unit 100 receives as inputs clock1 302, clock2 303, and the microprocessor reset# signal 301. The clock selection unit 100 detects if clock1 302 is active. If clock1 302 is found to be active, then the clock selection unit selects clock1 302 as the clock signal to be used internally. Otherwise, the clock selection unit 100 selects clock2 303.

When the microprocessor is in reset (when the microprocessor is being reset by the system), the reset# signal 301 is low. When the microprocessor comes out of reset, or is not being reset, the reset# signal 301 is high. Latch 320 is a clearing latch. While in reset, latch 320 is being cleared. Thus, latch 320 outputs a low value. When the microprocessor is not in reset and clock1 302 is high, then latch 320 latches a high value 308. Thus, when clock1 302 is detected, latch 320 outputs a signal called clock1 detect 304. If clock1 302 is not going to be used as the input clock, then clock1 302 must be tied low so the detect circuitry does not falsely latch the high signal. The clock1 detect signal 304 is used as the input to latch 321. The clock of latch 321 is an inversion of clock1, clock1# 305, created by sending clock1 302 through inverter 322. Thus, when clock1# 305 is high, or when clock1 302 is low, latch 321 latches the clock1 detect 304 signal, thereby outputting clock1 enable 306. Clock1 enable 306, clock1 302, and clock2 303 are the inputs to the clock selector 323, where the clock1 enable signal 306 is used to select between clock1 302 and clock2 303. When clock1 enable 306 is active (indicating that the clock1 signal 302 has been detected), then clock1 302 is selected as the internal clock 307. Otherwise, clock2 303 is selected. In this manner, the clock1 signal 302 is automatically detected and selected, upon detection, for use as the internal clock of the microprocessor.

Figure 4:
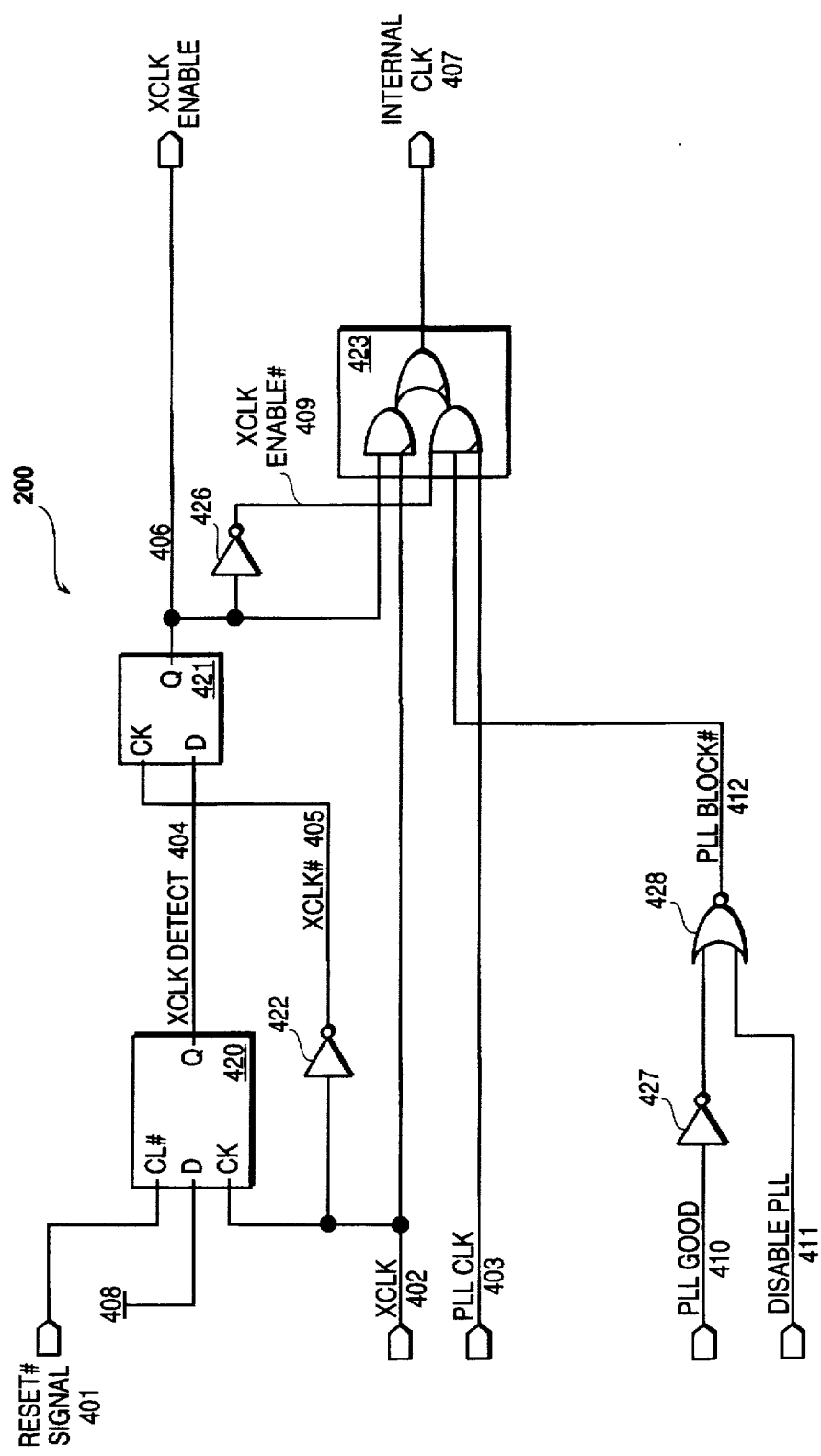
FIG. 4 is a circuit diagram of an apparatus to implement the automatic clock detect and source select of another embodiment of the present invention.

FIG. 4 shows a block diagram of one embodiment of the clock selection unit 200 of FIG. 2. As is shown, the clock selection unit 200 receives as inputs xclk 402, PLLclk 403, the microprocessor reset# signal 401, PLLgood 410, and disable PLL 411. Xclk 402 is the external clock provided by the system, and PLLclk 403 is the internal clock provided by the oscillator and PLL. The PLLgood signal 410 is an additional signal provided by the PLL that indicates when the PLL has locked and is outputting a good clock. The disable PLL 411 signal is used to disable the PLL when the external clock is being used.

The clock selection unit 200 detects if xclk 402 is active. If xclk 402 is found to be active, then the clock selection unit 200 selects xclk 402 as the clock signal to be used internally. Otherwise, the clock selection unit 200 selects PLLclk 403. When the microprocessor is in reset (when the microprocessor is being reset by the system), the reset# signal 401 is low. When the microprocessor comes out of reset, or is not being reset, the reset# signal 401 is high. Latch 420 is a clearing latch. While in reset, latch 420 is being cleared. Thus, latch 420 outputs a low value. When the microprocessor is not in reset, and the xclk signal 402 is high, latch 420 latches the high value 408. Thus, when xclk 402 is detected, latch 420 outputs a signal called xclk detect 404. If the external clock ("xclk") is not going to be used, the signal must be tied low so that the clock detection circuitry 200 does not falsely latch the high signal indicating that the xclk signal 402 is detected. The xclk detect signal 404 is used as the input to latch 421. The clock of latch 421 is an inversion of xclk, xclk# 405, created by sending xclk 402 through inverter 422. Thus, when xclk# 405 is high, or when xclk 402 is low, latch 421 latches the xclk detect 404 signal, thereby outputting xclk enable 406.

When xclk enable signal 406 is active, indicating that xclk 402 has been detected, the PLL may be disabled to save power. Therefore, the xclk enable signal 406 can be used, alone, or in conjunction with other signals, to turn off the PLL, and thus can be used as the disable PLL signal 411. The signal PLLgood 410 is inverted and NORed with disable PLL 411. Thus, when the PLL is not ready (PLLgood 410 is low) or when the PLL is disabled, the PLL block# signal 412 is low. This signal is then used to block the PLLclk 403. The PLL block# 412, xclk enable 406, xclk enable# 409 (an inversion of xclk enable 406), xclk 402, and PLLclk 403 are the inputs to the clock selector 423. The xclk enable signal 406 and the xclk enable# signal 409 are used to select between xclk 402 and PLLclk 403. When the xclk enable signal 406 is active (and the xclk enable# signal 409 is inactive), indicating that the xclk signal 402 has been detected, the xclk signal 402 is allowed to pass and the PLLclk 403 is blocked. Therefore, the xclk signal 402 is used as the internal clock 407. Similarly when xclk enable 406 is inactive (and xclk enable# 409 is active), indicating that the xclk signal 402 was not detected, PLLclk 403 is allowed to pass (assuming PLL block# is inactive) and the xclk signal 402 is blocked. In this manner, the xclk signal 402 is automatically detected and selected, upon detection, for use as the internal clock of the microprocessor.

Figure 5:
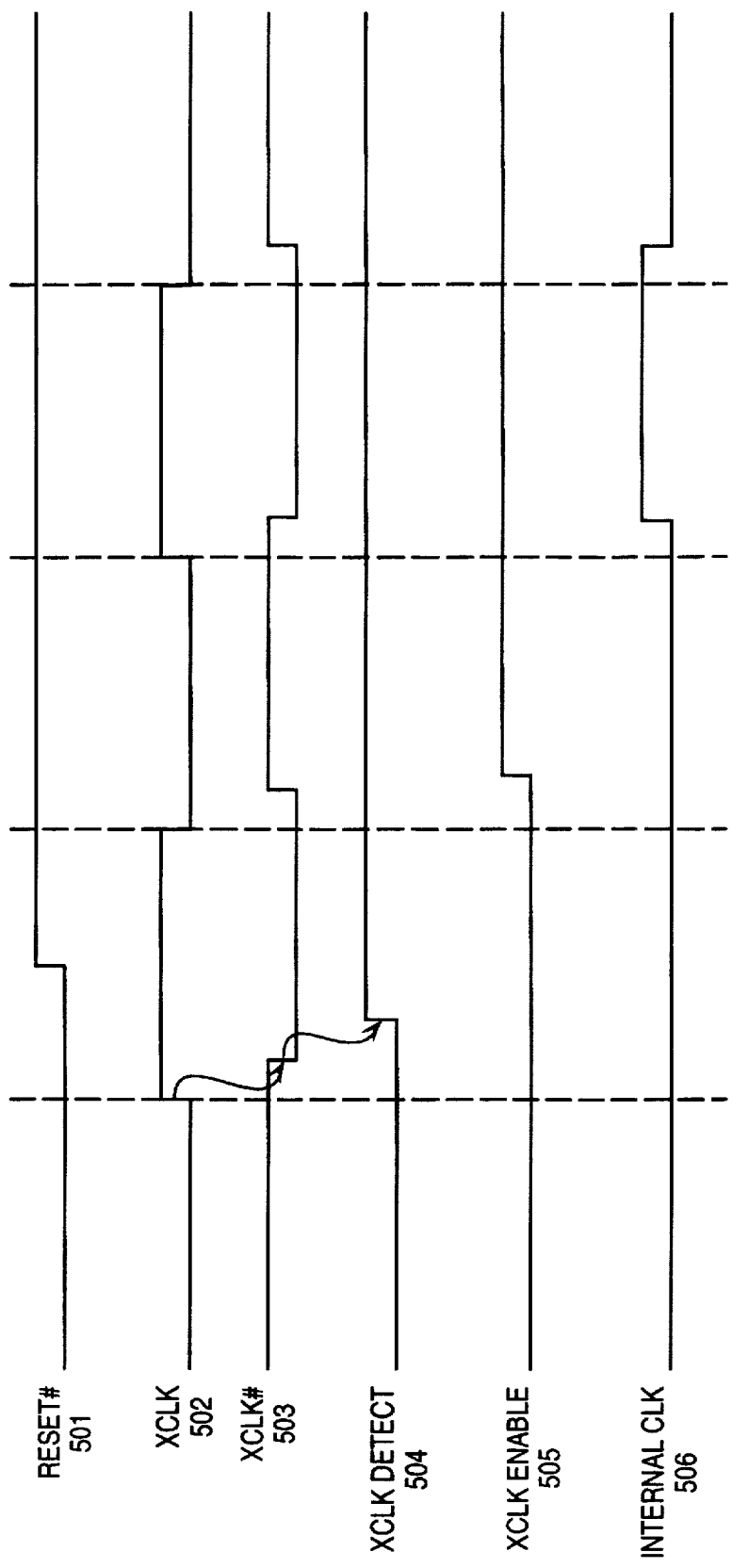
FIG. 5 is a timing diagram illustrating the internal clock generated by the circuits of FIGS. 3 and 4 in response to an active external clock.

FIG. 5 shows an exemplary timing diagram of the above circuits. As is shown, when the reset# signal 501 becomes inactive, the xclk detect signal 504 is latching a high value when the xclk signal 502 is active. When xclk# 503 becomes active, the high value of the xclk detect signal 504 is latched, and thus, the xclk enable signal 505 goes high after the xclk# signal 503 goes high. Once the xclk enable signal 505 is high, the xclk signal 502 is selected, and thus, the xclk signal 502 is used as the internal clk signal 506.

In the foregoing application, the invention has been described with reference to specific exemplary embodiments thereof. It will, however, be evident that various modifications and changes may be made thereto without depleting from the broader spirit and scope of the invention as set forth in the appended claims. The specification and drawings are, accordingly, to be regarded in an illustrative rather than a restrictive sense.

What is claimed is:

1. An apparatus for selecting a clock source in a microprocessor, the apparatus comprising:
   a first clock;
   a second clock; and
   a clock select unit capable of detecting the first clock and selecting between the first clock and the second clock without an external selection signal indicating which clock is to be selected and providing an output clock based on the selected clock, where the clock select unit selects the first clock if the first clock is detected and selects the second clock if the first clock is not detected.

2. The apparatus of claim 1, wherein the first clock is an external clock.

3. The apparatus of claim 1, wherein the second clock is an internally created clock.

4. The apparatus of claim 1 further comprising:

a microprocessor reset signal;

an inverter, the inverter receiving the first clock, and outputting an inversion of the first clock;

a first latch capable of providing an output signal indicating detection of the first clock, the first latch coupled to receive the microprocessor reset signal, the first clock, and a high signal, wherein the first latch clears the output when the reset signal is active and latches the high signal when the reset signal is inactive and the first clock signal is active; and a second latch capable of providing an output indicating that the first clock is to be enabled, the second latch coupled to receive the output of the inverter and the output of the first latch, wherein the second latch latches the output of the first latch when the output of the inverter is active.

5. The apparatus of claim 4, wherein the clock select unit is coupled to receive the first clock, the second clock and the output of the second latch, where the output of the second latch is used to select between the first clock and the second clock as the output clock.

6. The apparatus of claim 4, wherein the output of the second latch is ANDed with the first clock such that the first clock is allowed to pass when the output of the second latch is active.

7. The apparatus of claim 4, wherein the output of the second latch in inverted and the inversion is ANDed with the second clock such that the second clock is allowed to pass when the output of the second latch is inactive.

8. The apparatus of claim 4 where the clock select unit comprises:

a first AND gate;

a second AND gate;

an OR gate;

the first AND gate coupled to receive the first clock signal and the output signal from the second latch, the first AND gate outputting the first clock signal when the output signal from the second latch is active and outputting an inactive signal when the output signal from the second latch is inactive;

the second AND gate couple to receive the second clock signal and an inversion of the output signal from the second latch, the second AND gate outputting the second clock signal when the inverted output signal from the second latch is active and outputting an inactive signal when the inverted output signal from the second latch is inactive; and the OR gate coupled to receive the output from the first AND gate and the second AND gate such that the OR gate outputs the first clock signal when the output signal from the second latch is active and outputs the second clock signal when the inverted output signal from the second latch is active.

9. The apparatus of claim 4, wherein the second clock is an internally created clock.

10. The apparatus of claim 9 where the internally created clock is blocked when the output of the second latch is active indicating detection of the first clock.

* * * * *